US 12,219,231 B2

(12) United States Patent
Graae et al.

(10) Patent No.: US 12,219,231 B2
(45) Date of Patent: Feb. 4, 2025

(54) LARGE IMAGE SENSOR PACKAGE

(71) Applicant: Sphere Entertainment Group, LLC, New York, NY (US)

(72) Inventors: Michael Graae, Brooklyn, NY (US); Deanan Dasilva, Malibu, CA (US); Jason Daughenbaugh, Bozeman, MT (US); Bryan Robertus, Bozeman, MT (US); Jason Kay, Bozeman, MT (US); Logan Mcdermot, Marshall, WI (US); Wayne Hansen, Lodi, WI (US); Timothy J. Bierman, Windsor, WI (US)

(73) Assignee: Sphere Entertainment Group, LLC, New York, NY (US)

( * ) Notice: Subject to any disclaimer, the term of this patent is extended or adjusted under 35 U.S.C. 154(b) by 159 days.

(21) Appl. No.: 17/887,309

(22) Filed: Aug. 12, 2022

(65) Prior Publication Data

US 2024/0056666 A1    Feb. 15, 2024

(51) Int. Cl.
*H04N 23/55*        (2023.01)
*H01R 13/6584*     (2011.01)
*H04N 23/57*        (2023.01)

(52) U.S. Cl.
CPC ......... *H04N 23/55* (2023.01); *H01R 13/6584* (2013.01); *H04N 23/57* (2023.01); *H01R 2201/18* (2013.01)

(58) Field of Classification Search
CPC ........ H04N 23/55; H04N 23/57; H04N 23/54; H01R 13/6584; H01R 2201/18
See application file for complete search history.

(56) References Cited

U.S. PATENT DOCUMENTS

| 5,751,500 A | 5/1998 | Bedzyk |
| 7,405,760 B2 | 7/2008 | Cho et al. |

(Continued)

FOREIGN PATENT DOCUMENTS

| CN | 110873994 A | 3/2020 |
| CN | 116261023 A | 6/2023 |

(Continued)

OTHER PUBLICATIONS

Rockwell Ken: "Nikon 300mm f/4 AF Review", Jun. 1, 2018; 7 pages.

(Continued)

*Primary Examiner* — Albert H Cutler
(74) *Attorney, Agent, or Firm* — Sterne, Kessler, Goldstein & Fox P.L.L.C.

(57) ABSTRACT

Disclosed herein is an image sensor package including a printed circuit board, an image sensor electrically coupled to the printed circuit board, a sealing configuration coupled to a front face of the printed circuit board via a first gasket, and a base coupled to a back face of the printed circuit board via a second gasket. Electronic components embedded on the back face of the printed circuit board align with and connect to mating pads surrounding the image sensor on the front face of the printed circuit board. Wire bonds electrically connect the image sensor to the mating pads and the electronic components. The sealing configuration includes a cover attached to a frame surrounding the image sensor. A gap separates the image sensor from abutting the surrounding printed circuit board, which is coupled to the image sensor via the base.

20 Claims, 9 Drawing Sheets

(56) References Cited

U.S. PATENT DOCUMENTS

| | | |
|---|---|---|
| 10,901,306 B2 | 1/2021 | Yamazaki |
| 2011/0189808 A1* | 8/2011 | Watanabe ......... H01L 27/14687 |
| | | 438/66 |
| 2012/0113276 A1* | 5/2012 | Van Arendonk ....... H04N 23/45 |
| | | 348/207.99 |
| 2013/0222685 A1* | 8/2013 | Topliss ..................... G03B 5/00 |
| | | 348/373 |
| 2015/0326766 A1* | 11/2015 | Czepowicz ............ H04N 23/55 |
| | | 348/360 |
| 2017/0104022 A1* | 4/2017 | Okamura ................ H05K 1/184 |
| 2017/0123298 A1 | 5/2017 | Hine et al. |
| 2017/0146766 A1* | 5/2017 | Hsu ........................ H04N 23/45 |
| 2017/0214830 A1* | 7/2017 | Tang ....................... H04N 23/55 |
| 2018/0007243 A1* | 1/2018 | Maatta ................... H04N 23/51 |
| 2018/0084647 A1* | 3/2018 | Nalla ..................... H05K 3/4697 |
| 2018/0102123 A1* | 4/2018 | Tisch ...................... H04R 3/005 |
| 2018/0114804 A1* | 4/2018 | Hsieh ................ H01L 27/14678 |
| 2019/0174087 A1* | 6/2019 | Kim ........................ H04N 25/79 |
| 2020/0200240 A1 | 6/2020 | Kondo |
| 2021/0074750 A1 | 3/2021 | Gu et al. |
| 2022/0006926 A1* | 1/2022 | Knox ...................... G03B 17/02 |
| 2022/0006929 A1* | 1/2022 | Li .......................... H04N 23/57 |
| 2022/0174191 A1* | 6/2022 | Niu ........................ H04N 23/54 |
| 2024/0064394 A1 | 2/2024 | Shin et al. |
| 2024/0107141 A1* | 3/2024 | Jo .......................... H04N 23/57 |

FOREIGN PATENT DOCUMENTS

| | | |
|---|---|---|
| EP | 3693790 B1 | 10/2022 |
| JP | 2000180689 A | 6/2000 |
| JP | 5573164 B2 | 8/2014 |
| WO | WO 2022/145954 A1 | 7/2022 |

OTHER PUBLICATIONS

International Search Report and Written Opinion directed to related International Application No. PCT/US2023/074935, mailed Apr. 25, 2024; 9 pages.

International Search Report and Written Opinion directed to related International Application No. PCT/US2023/074912, mailed Apr. 24, 2024; 11 pages.

* cited by examiner

LARGE IMAGE SENSOR PACKAGE

TECHNICAL FIELD

The present disclosure relates to an image sensor package for a large format camera system.

BACKGROUND

A camera is a device used to capture and record real-life images in the form of photographs and/or videos. In order to capture and record such images, cameras generally comprise a camera body and a camera lens. The camera lens passes light reflected from objects in the real world and focuses the light onto an imaging plane in the camera body that captures the focused light as an image. The image may then be used to generate a photograph or a frame in a high quality video stream. The camera body may also include processors to execute computer-readable instructions that control various operations of the camera and a memory storage to save the captured images. Some cameras may receive power from an external power source (e.g., via a wire connection to a power outlet) while other cameras may receive power from an internal power source (e.g., a built-in or attachable battery pack). Various components of the camera must be adjusted and/or improved over time in order to keep up with the constantly evolving demand for higher resolution photographs, higher quality videos, larger display screens, faster streaming speed, and so on.

BRIEF SUMMARY

Disclosed herein are system, apparatus, device, method and/or computer program product embodiments, and/or combinations and sub-combinations thereof related to an image sensor package for a large format camera system. The image sensor package is configured to mechanically decouple various components in the image sensor package (e.g., the image sensor, ceramic base, alumina frame, glass cover, etc.) to accommodate for differing thermal expansion of adjacent and cemented together components during operation and to preserve signal integrity. The image sensor package is further configured to strategically place electronic components, such as capacitors, closer to an image sensor in the image sensor package while keeping mating pads between the sensor and printed circuit board surrounding the image sensor free of electronic components, thereby improving signal transmission and minimizing potential risks of pad contamination in the image sensor package.

In some embodiments, an image sensor package includes, among other things, a printed circuit board having a first face and a second face, an image sensor electrically coupled to the printed circuit board via a plurality of wire bonds, a sealing configuration coupled to the first face of the printed circuit board via a first gasket or epoxy, a base coupled to the second face of the printed circuit board via a second gasket or epoxy, and a plurality of electronic components embedded on the second face of the printed circuit board. The plurality of wire bonds electrically connect the image sensor to mating pads positioned on the first face of the printed circuit board. The sealing configuration includes a cover attached to a frame that surrounds a perimeter of the image sensor. The base couples the image sensor to the printed circuit board. The plurality of electronic components align with the mating pads on the first face of the printed circuit board. The printed circuit board surrounds the image sensor, and the image sensor is separated from abutting the printed circuit board by a gap.

In some examples, the first gasket is a first ball-bearing positioned within a first groove in the frame of the sealing configuration that allows the sealing configuration to be movable while abutting the first face of the printed circuit board.

In some examples, the second gasket is a second ball-bearing positioned within a second groove in the base that allows the base to be movable while abutting the second face of the printed circuit board.

In some examples, the base further comprises a channel surrounding the perimeter of the image sensor, and the plurality of electronic components are positioned within the channel in the base.

In some examples, the mating pads on the first face of the printed circuit board surrounds the perimeter of the image sensor and are positioned between the frame and the image sensor. The area including the mating pads is hermetically sealed by the sealing configuration to protect the image sensor from potential pollutants in the ambient environment.

In some examples, the mating pads on the first face of the printed circuit board are electrically coupled to the plurality of electronic components embedded on the second face of the printed circuit board.

In some examples, the frame positions the cover a predetermined distance away from the image sensor.

In another embodiment, an image sensor package includes, among other things, an image sensor, a printed circuit board surrounding the image sensor, a gap separating the image sensor from abutting the surrounding printed circuit board, and a plurality of electronic components embedded in the printed circuit board. The printed circuit board has a first face and a second face. The image sensor is electrically coupled to the surrounding printed circuit board via a plurality of wire bonds connecting to the first face of the printed circuit board. The plurality of electronic components are embedded on the second face of the printed circuit board and aligned with the plurality of wire bonds on the first face of the printed circuit board. The plurality of wire bonds electrically connect the image sensor and the plurality of electronic components via the printed circuit board.

In yet another embodiment, an image sensor package includes, among other things, an image sensor, a printed circuit board surrounding the image sensor, a sealing configuration, and a base. The printed circuit board has a first face and a second face. The sealing configuration is coupled to the first face of the printed circuit board via a first gasket. The base is coupled to the second face of the printed circuit board via a second gasket, wherein the base couples the image sensor to the surrounding printed circuit board.

Descriptions provided in the summary section represent only examples of the embodiments. Other embodiments in the disclosure may provide varying scopes different from the description in the summary.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments. It is noted that, in accordance with the standard practice in the industry, features are not drawn to scale. In fact, the dimensions of the features may be arbitrarily increased or reduced for clarity of discussion.

In the drawings, like reference numbers generally indicate identical or similar elements. Additionally, generally, the left-most digit(s) of a reference number identifies the drawing in which the reference number first appears.

Figure 1:
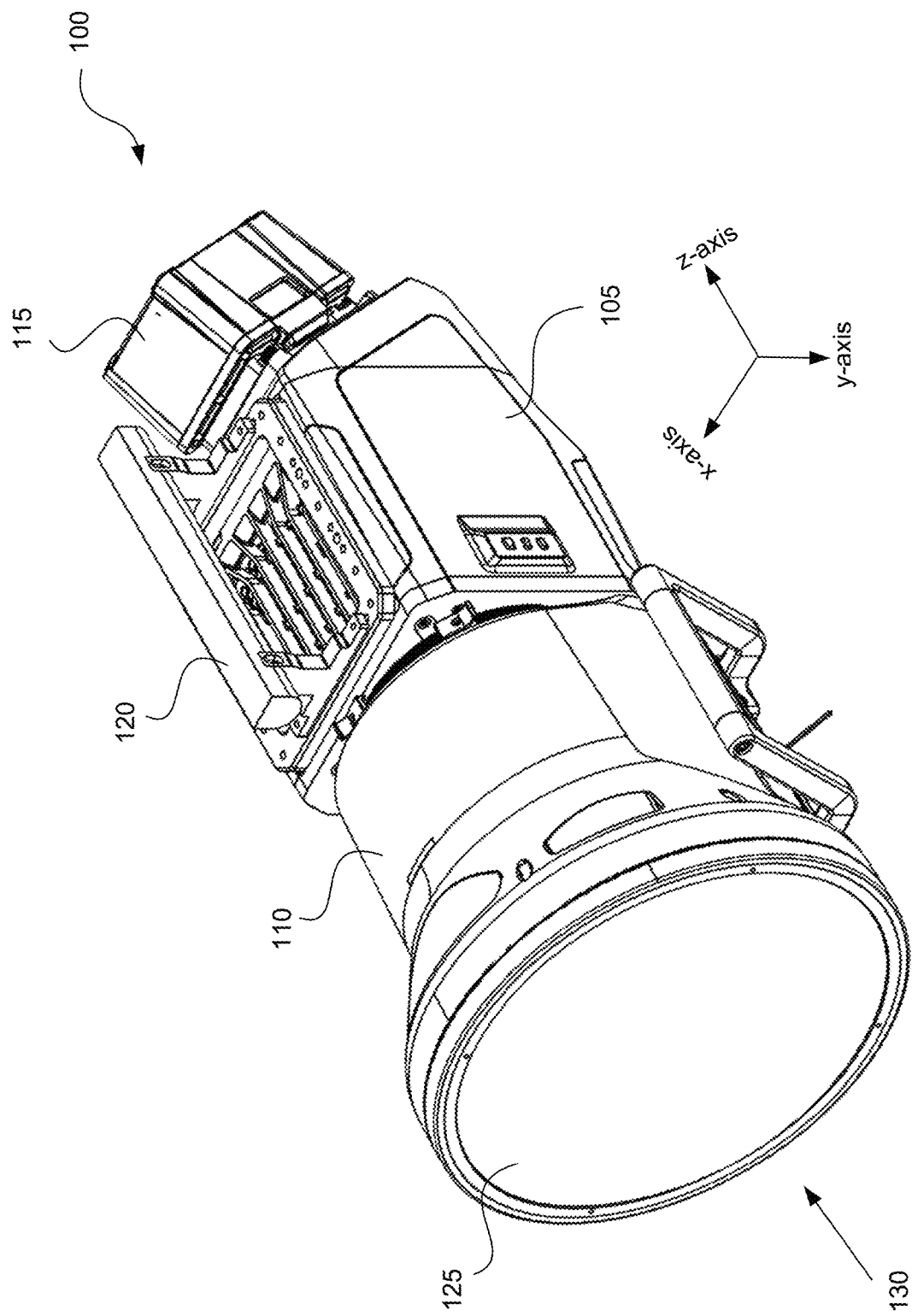
FIG. 1 illustrates a perspective view of an exemplary camera system including a camera body and a lens housing, according to an exemplary embodiment of the present disclosure.

Aspects of the present disclosure will be described with reference to the accompanying drawings.

DETAILED DESCRIPTION

A camera system may include a camera lens, a camera body, and a power source. In some camera systems, the camera lens may be removably attachable to a camera body. Light enters the camera lens, which focuses the incoming light onto a focal point in a center of an imaging plane located within the camera body. The imaging plane captures the focused light as an image, which may then be used to generate a high resolution photograph or a frame in a high quality video stream.

The imaging plane may be an image sensor package including a printed circuit board and an image sensor. The image sensor may be coupled to a base via a thermally conductive epoxy, and the base may couple the image sensor to one side of the printed circuit board. On the other side of the printed circuit board, the image sensor may be protected from potential pollutants in the outside environment by a sealing mechanism with a frame and cover configuration. The cover may be coupled to the frame, and the frame may surround the image sensor such that the frame and cover configuration create a hermetic seal to protect the image sensor from outside pollutants, such as dust and debris that may affect the quality of the captured image.

Each of the components in the image sensor package, including but not limited to the image sensor, the base, the cover, the frame, and the printed circuit board, may have a different coefficient of thermal expansion. During operation of the camera system, the image sensor may produce significant thermal output, thereby causing each component of the image sensor package to expand or contract at different rates based on each component's respective coefficient of thermal expansion. This may cause various components of the image sensor package to negatively interfere with and affect the performance of other components. For example, the image sensor may expand at a different rate than the base and the printed circuit board, therefore causing cracking in the image sensor or printed circuit board. Likewise, the frame may expand at a different rate than the cover, therefore causing cracking of the cover and compromising the integrity of the sealing mechanism protecting the image sensor from pollutants in the outside environment. In order to ameliorate these issues, adjacent components in the image sensor package may be made from materials with substantially similar coefficients of thermal expansion. For example, the frame may be made of alumina while the cover may be made of glass. Because alumina and glass have similar coefficients of thermal expansion, they may expand or contract at similar rates during operation of the camera system and prevent excessive cracking of one component or the other.

However, merely using materials with substantially similar coefficients of thermal expansion for adjacent components in the image sensor package is often not enough to preserve the integrity of various components and to ensure optimal operation of the image sensor package. Issues of different thermal expansion rates between adjacent components are especially prevalent in large format camera systems because components are larger in size, and any potential thermal expansion of a component will more significantly impact those adjacent components. Therefore, additional mechanisms are needed to accommodate for different thermal expansion rates of adjacent components during operation.

Embodiments described herein are directed to an image sensor package for a large format camera system. The image sensor package is configured to mechanically decouple various components in the image sensor package (e.g., the image sensor, ceramic base, alumina frame, glass cover, etc.) to accommodate for thermal expansion of adjacent components during operation and to preserve signal integrity. The image sensor package is further configured to strategically place electronic components, such as capacitors, closer to the image sensor in the image sensor package while keeping mating pads surrounding the image sensor free of electronic components, thereby improving signal transmission and minimizing potential risks of pad contamination in the image sensor package.

The image sensor package of the present disclosure includes a printed circuit board, an image sensor electrically coupled to the printed circuit board, a sealing configuration coupled to a front face of the printed circuit board via a first gasket, and a base coupled to a back face of the printed circuit board via a second gasket. The first gasket mechanically decouples the sealing configuration from other components in the image sensor package, and the second gasket mechanically decouples the base (epoxied to the image sensor) from other components in the image sensor package.

This allows various components of the image sensor package to expand or contract at different rates during operation without negatively impacting adjacent components, as explained in further detail below with reference to the figures. Furthermore, electronic components embedded on the back face of the printed circuit board align with and electrically connect to mating pads surrounding the image sensor on the front face of the printed circuit board. Wire bonds electrically connect the image sensor to the mating pads on the front face of the printed circuit board, therefore also forming an electrical connection between the image sensor and the electronic components on the back face of the printed circuit board. By placing the electric components on the back face of the printed circuit board and in alignment with the mating pads on the front face of the printed circuit board, the image sensor package may minimize signal transmission distance and decrease risks of pad contamination.

It should be understood by those skilled in the art that the meaning of "on," "above," and "over" in the present disclosure should be interpreted in the broadest manner such that "on" not only means "directly on" something, but also includes the meaning of "on" something with an intermediate feature or a layer therebetween. Moreover, "above" or "over" not only means "above" or "over" something, but can also include the meaning it is "above" or "over" something with no intermediate feature or layer therebetween (i.e., directly on something).

Furthermore, spatially relative terms, such as "front," "back," "left," "right," "top," "bottom," "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at another orientation) and the spatially relative descriptors used herein may likewise be interpreted accordingly.

FIG. 1 illustrates a perspective view of an exemplary camera system 100, according to some embodiments of the present disclosure. In one embodiment, camera system 100 includes a camera body 105, a lens housing 110, and a power source 115. Camera body 105 may include a handle 120 that allows a user to support, carry, or otherwise physically manipulate camera system 100. It should be understood by those skilled in the art that other configurations and designs for handle 120 may be used to support camera system 100 in other embodiments of the present disclosure and not exhaustively disclosed herein. In some embodiments, power source 115 may be removably coupled to camera body 105 and configured to provide sufficient voltage to power operations of camera body 105. For example, power source 115 may be a removable battery pack providing a DC voltage to camera body 105. In another example, power source 115 may be a power outlet providing an AC voltage via a plug and wire connectable to camera body 105. In other embodiments, power source 115 may be incorporated into camera body 105 and not removable by a user. For example, power source 115 may be a single use battery or a rechargeable battery positioned within camera body 105.

Lens housing 110 may provide mechanical support for a number of camera lenses 125 positioned along a z-axis of lens housing 110. Each camera lens 125 may be separated by a predetermined distance along the z-axis such that incoming light 130 is ideally focused on an imaging plane in camera body 105. In some embodiments, the predetermined distance between each pair of lens 125 may be a number calculated to achieve a desired focus of incoming light 130 on the imaging plane. It should also be understood by those skilled in the art that the predetermined distance between each pair of lens 125 may be the same or different in various embodiments of the present disclosure. Furthermore, the predetermined distance between each pair of lens 125 may be manually or automatically adjustable in some embodiments of the present disclosure. Lens housing 110 may further include an exterior cover (not separately enumerated) that protects camera lens 125 from the external environment (e.g., dust, weather, debris, etc.).

In some embodiments of camera system 100, lens housing 110 may be removably coupled to camera body 105. This scenario allows a user to exchange one lens housing 110 including a certain configuration of camera lenses 125 that achieve a certain focus with another lens housing 110 including a different configuration of camera lenses 125 that achieve a different focus. In other embodiments of camera system 100, lens housing 110 may be attached to camera body 105 during the manufacturing process of camera system 100 such that a user cannot easily exchange one lens housing 110 with another lens housing 110 without disassembling camera system 100. This scenario may provide a camera system 100 that is more robust (i.e., no possibility of users improperly connecting lens housing 110 to camera body 105, resulting in "slop" in alignment) but less flexible in changing a desired focus of incoming light 130 on the imaging plane.

Figure 2:
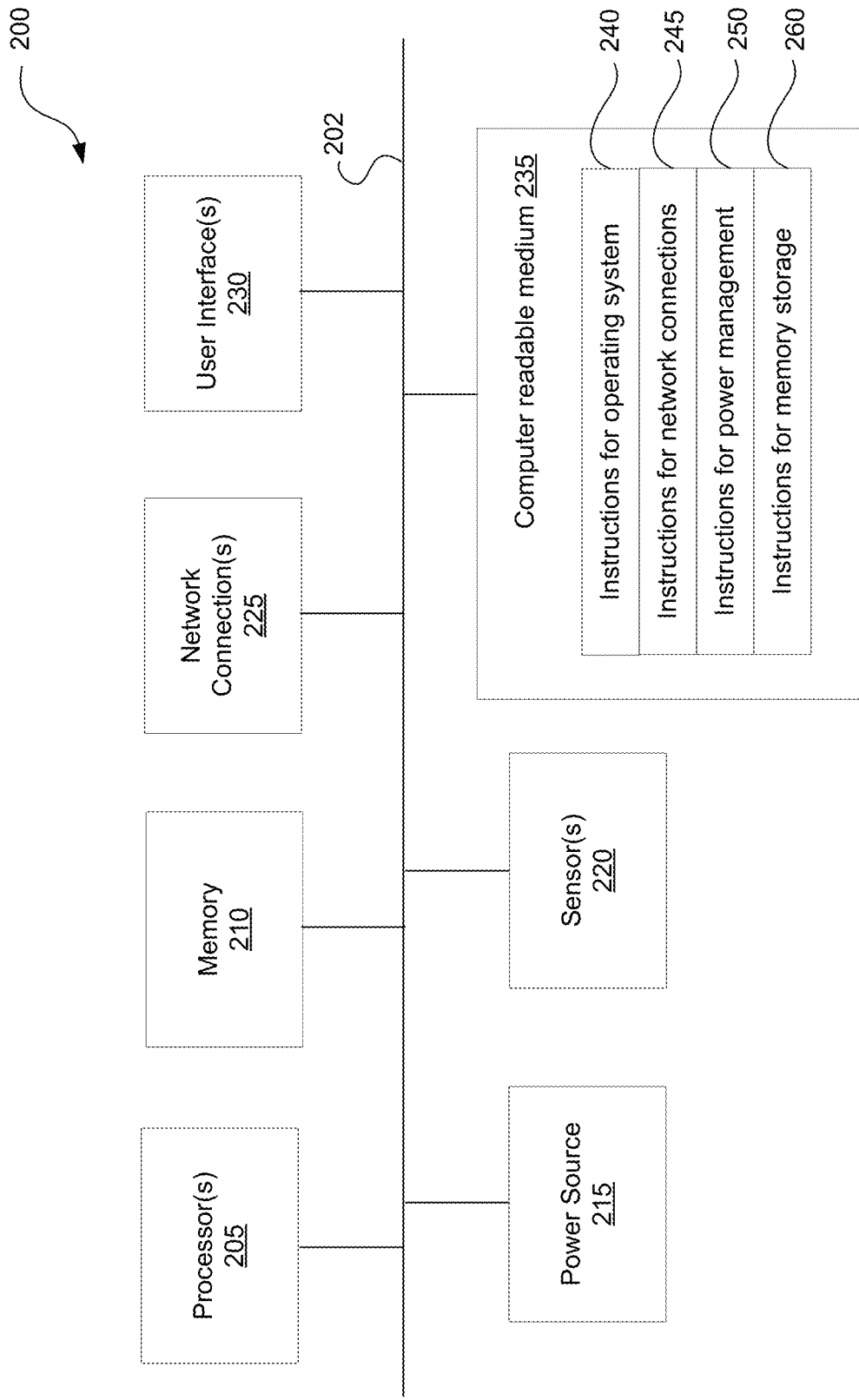
FIG. 2 illustrates a block diagram of an exemplary computer system used within the camera body illustrated in FIG. 1, according to an exemplary embodiment of the present disclosure.

FIG. 2 illustrates a block diagram of an exemplary computer system 200 used within camera body 105 illustrated in FIG. 1, according to an exemplary embodiment of the present disclosure.

Various embodiments may be implemented, for example, using one or more well-known computer systems, such as the exemplary computer system 200 shown in FIG. 2. One or more computer systems 200 may be used, for example, to implement any of the embodiments discussed herein, as well as combinations and sub-combinations thereof. The computer system 200 may be used to control various components of camera system 100, including but not limited to various operations of components within camera body 105 and components within lens housing 110.

In some embodiments, exemplary computer system 200 may include one or more processors 205, a memory 210, a power source 215, one or more sensors 220, one or more network connections 225, one or more user interfaces 230, and one or more computer readable mediums 235. It should be understood by those skilled in the art that other embodiments of the present disclosure may have more components or less components than that listed herein. Each of these components may be coupled by bus 202, which enables communication between various components of the exemplary computer system.

Bus 202 may be any known internal or external bus technology, including but not limited to ISA, EISA, PCI, PCI Express, NuBus, USB, Serial ATA, Ethernet or FireWire. Processors 205 (also called central processing units, or CPUs) may use any known processor technology, including but not limited to graphics processors (also called graphics processing units, or GPUs) and multi-core processors. In some embodiments, a GPU may be a processor that has a specialized electronic circuit design to process mathematically intensive applications. The GPU may have a parallel structure that is efficient for parallel processing of large blocks of data, such as mathematically intensive data common to computer graphics applications, images, videos, etc.

Memory 210 may include a main or primary memory and one or more secondary memories. In some embodiments, the primary memory may be volatile memory, such as cache memory, random access memory (RAM), SDRAM, ROM, etc. The primary memory may include one or more levels of cache that have stored therein control logic (i.e., computer software) and/or data. In some embodiments, the one or more secondary memories may be non-volatile memory, for example, a hard disk drive, optical disks, magnetic tape, floppy disks, flash drives, etc. The one or more secondary memories may include a removable storage drive that may interact with a removable storage unit by reading from and/or writing to the removable storage unit. It should be understood by those skilled in the art that the exemplary types of memories and devices listed herein are not exhaustive, and any other computer data storage devices may be used in other embodiments of the present disclosure.

Power source 215 may be DC voltage (e.g., battery pack) or AC voltage (e.g., wired power outlet), as described above. Sensors 220 may be any type of sensor that allows exemplary computer system 200 to perform operations of camera body 105, including but not limited to image sensors, current sensors, temperature sensors, proximity sensors, etc. Network connections 225 may include transmitters and receivers that allow exemplary computer system 200 to form electrical communications with any combination of external devices, external networks, external entities, etc. For example, network connections 225 may allow computer system 200 to communicate with the Internet or other camera systems 100. In some embodiments, this communication may occur over a communication path, which may be wired and/or wireless (or a combination thereof), and which may include any combination of LANs, WANs, the Internet, etc. Control logic and/or data may be transmitted to and from computer system 200 via the communication path.

User interfaces 230 allow a user to communicate with exemplary computer system 200 and vice versa. In some embodiments, user interfaces 230 may include input devices that allow the user to input control commands to exemplary computer system 200 and display devices that allow exemplary computer system 200 to communicate information and status of operations of camera body 105 to the user. For example, input devices may be any known input device technology, including but not limited to a keyboard (including a virtual keyboard), pointing devices, mouse, track ball, and touch-sensitive pad or display, which allows the user to manually provide an input to exemplary computer system 200. Display devices may be any known display technology, including but not limited to monitors and/or display devices using Liquid Crystal Display (LCD) or Light Emitting Diode (LED) technology. In some embodiments, display devices may be located on camera body 105 and allow exemplary computer system 200 to output information to the user.

Computer-readable medium 235 may be stored on memory 210 and contain instructions to processors 205 for operation of exemplary computer system 200. In some embodiments, computer-readable medium 235 may include various instructions 240-260. In one example, computer-readable medium 235 may include various instructions 240 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input devices of user interfaces 230; sending output to display devices of user interfaces 230; organizing files and directories on memory 210; controlling accessory devices connected to camera body 105 (e.g., adjusting the predetermined distance between camera lens 125 in attached lens housing 110), which can be controlled directly or through an I/O controller; and managing traffic on bus 202. In another example, computer-readable medium 235 may also include various instructions 245 for establishing and maintaining network connections (e.g., software for implementing communication protocols, such as TCP/IP, HTTP, Ethernet, telephony, etc.). In another example, computer-readable medium 235 may further include various instructions 250 to perform power management based on information collected by sensors 220 (e.g., enter power saving mode when voltage from power source 215 falls below a threshold). In yet another example, computer-readable medium 235 may further include various instructions 260 to perform memory storage operations to store captured images to memory 210. The exemplary instructions described herein are for illustrative purposes only and are not intended to be exhaustive. Those of ordinary skill in the art will recognize that various other types of instructions achieving different purposes may be included in computer-readable medium 235 in other embodiments of the present disclosure.

Exemplary computer system 200 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Exemplary computer system 200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. Such control logic, when executed by one or more data processing devices (such as the computer system 200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 2. In particular, embodiments can operate with software, hardware, and/or operating system implementations other than those described herein.

FIGS. 3-9 illustrate various views of an exemplary image sensor package 300 configured to be the imaging plane in camera body 105, as explained above.

Figure 3:
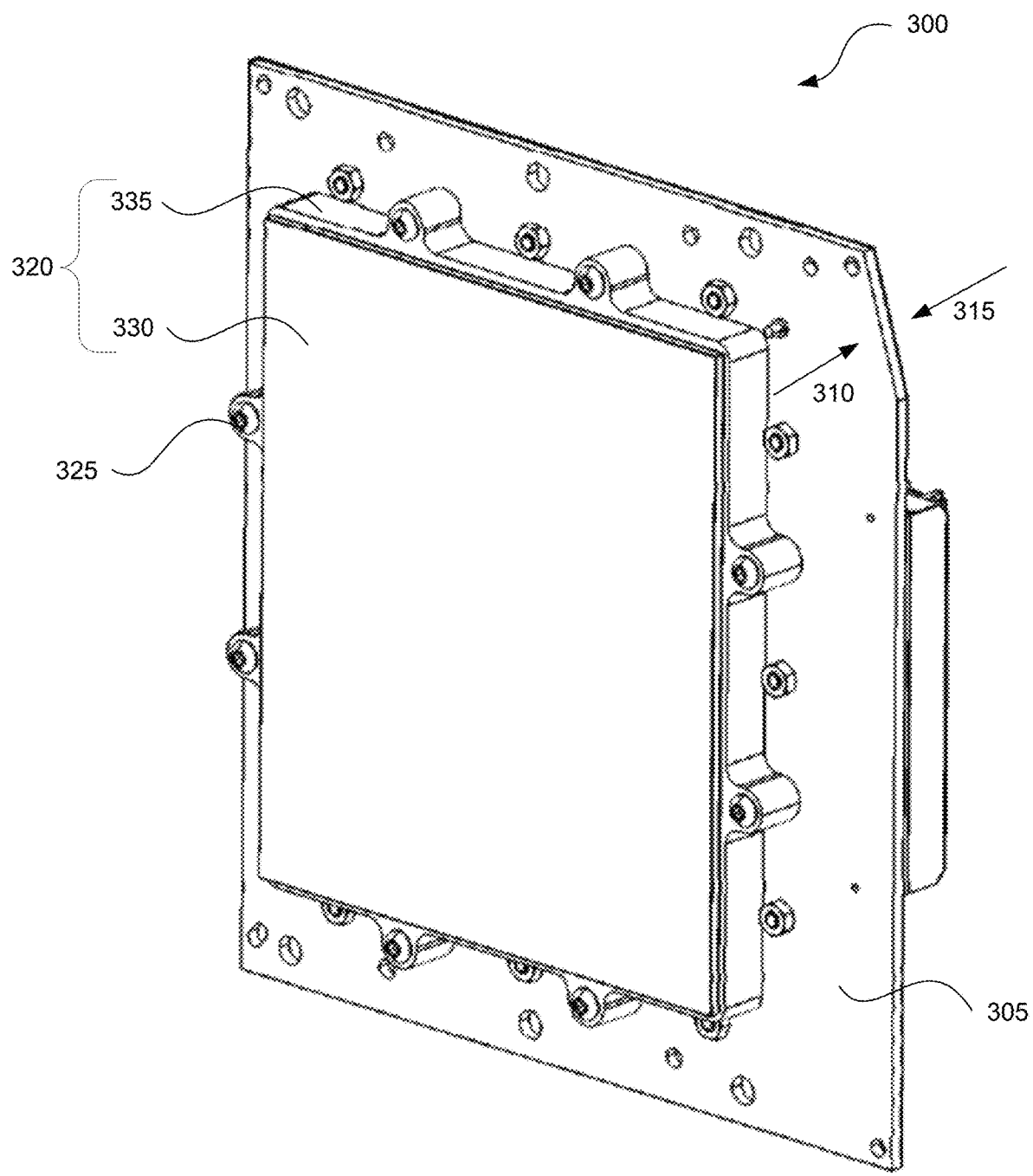
FIG. 3 illustrates a front perspective view of an image sensor package having a sealing configuration including a cover and a frame, according to an exemplary embodiment of the present disclosure.
Figure 4:
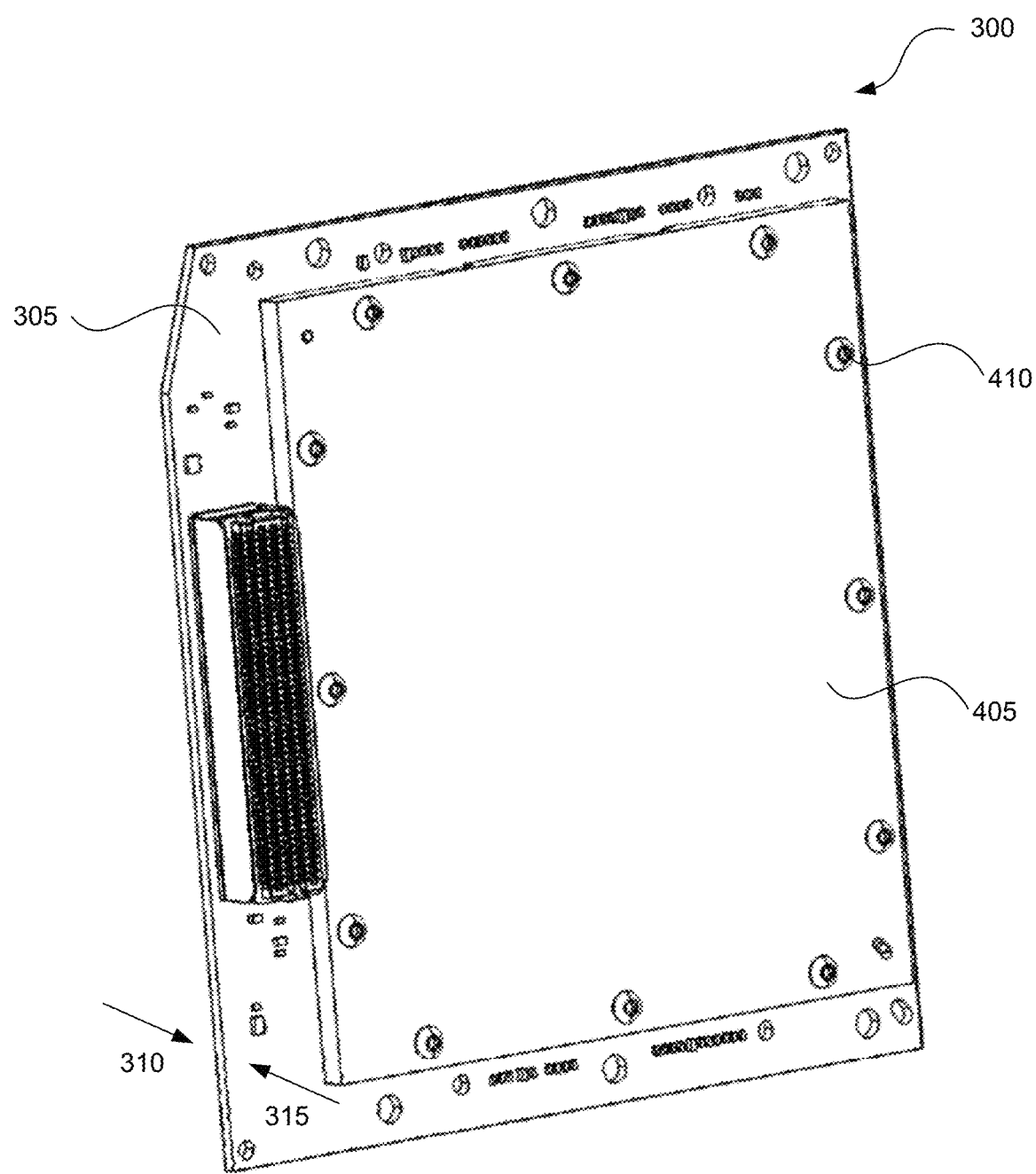
FIG. 4 illustrates a back perspective view of the image sensor package shown in FIG. 3, according to an exemplary embodiment of the present disclosure.

FIG. 3 illustrates a front perspective view of image sensor package 300, and FIG. 4 illustrates a back perspective view of image sensor package 300, according to some embodiments of the present disclosure. In the embodiment illustrated in FIGS. 3 and 4, image sensor package 300 includes a printed circuit board 305 having a front face 310 and a back face 315. In some embodiments, the printed circuit board 305 may contain various components of the exemplary computer system illustrated in the block diagram of FIG. 2, as explained above. A sealing configuration 320 is coupled to front face 310 of printed circuit board 305 via a number of fasteners 325 (see FIG. 3), while a base 405 is coupled to back face 315 of printed circuit board 305 via a number of fasteners 410 (see FIG. 4). It should be understood by those skilled in the art that fasteners 325, 410 may be screws, nails, epoxy, or any other type of mechanical or chemical fasteners in other embodiments of the present disclosure and not exhaustively listed herein.

Referring to FIG. 3, sealing configuration 320 may include a cover 330 coupled to a frame 335. In order to accommodate for thermal expansion of the components that make up sealing configuration 320 (e.g., cover 330 and frame 335), the components of sealing configuration 320 may be made from materials that have substantially similar coefficients of thermal expansion. For example, cover 330 may be made from glass while frame 335 may be made from alumina. Since glass and alumina have substantially similar coefficients of thermal expansion, cover 330 and frame 335 will expand and/or contract at substantially the same rate during operation of image sensor package 300, thus preventing excessive cracking of cover 330 or frame 335 during operation. It should be understood by those skilled in the art that various other materials with similar coefficients of thermal expansion may be used for cover 330 and frame 335 in other embodiments of the present disclosure.

Figure 5:
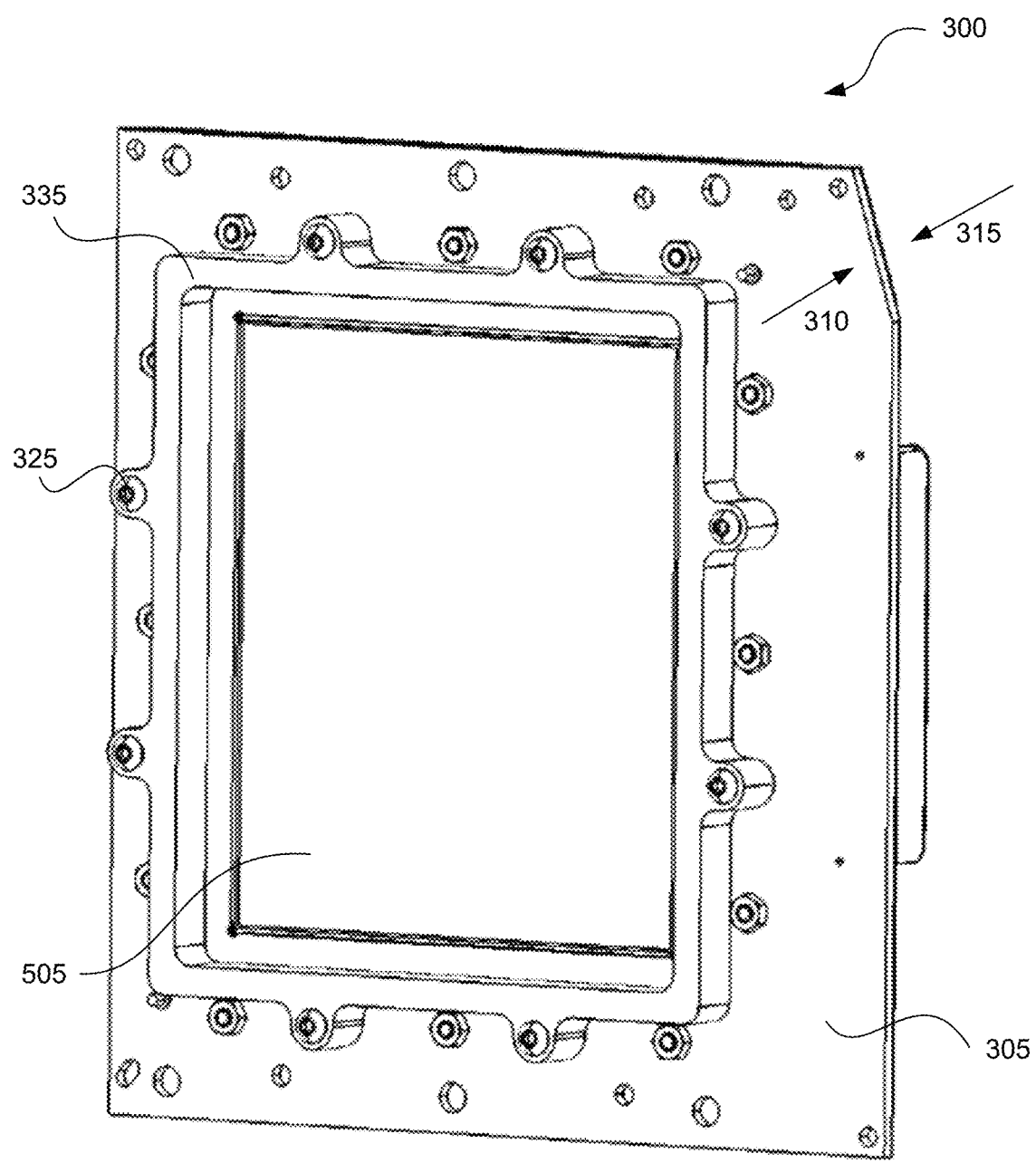
FIG. 5 illustrates a front perspective view of the image sensor package with the cover of the sealing configuration removed, according to an exemplary embodiment of the present disclosure.

FIG. 5 illustrates a front perspective view of image sensor package 300 with cover 330 of sealing configuration 320 removed, exposing an image sensor 505 beneath. In some embodiments, image sensor 505 may the imaging plane of camera system 100 configured to capture an image. It should be understood by those skilled in the art that image sensor 505 may be any shape or size in various embodiments without deviating from the teachings of the present disclosure. As shown in the embodiment illustrated in FIG. 5, frame 335 surrounds a perimeter of image sensor 505. When cover 330 is coupled to frame 335 and frame 335 is coupled to front face 310 of printed circuit board 305, sealing configuration 320 including cover 330 and frame 335 creates a hermetic seal around image sensor 505. This hermetic seal keeps potential pollutants in the environment (e.g., dust, debris, etc.) from affecting the image captured by image sensor 505, thus ensuring the quality of the captured image.

Figure 6:
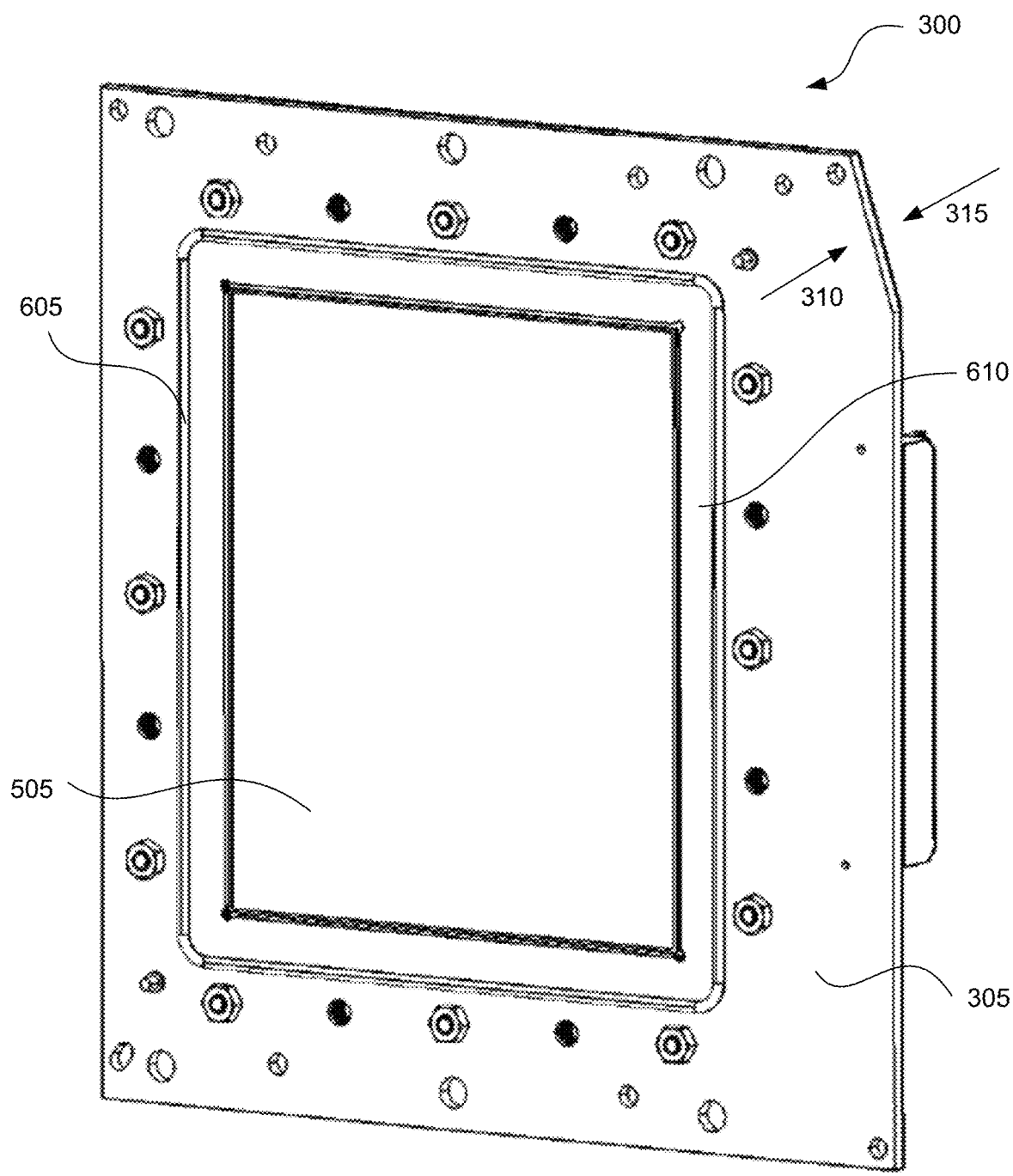
FIG. 6 illustrates a frontal perspective view of the image sensor package with the cover and the frame of the sealing configuration removed, according to an exemplary embodiment of the present disclosure.

FIG. 6 illustrates a frontal perspective view of image sensor package 300 with sealing configuration 320 entirely removed, including cover 330 and frame 335. This exposes a first gasket 605 positioned beneath frame 335 and a mating pad area 610 positioned between first gasket 605 and image sensor 505 on front face 310 of printed circuit board 305.

First gasket 605 is configured to mechanically decouple sealing configuration 320 from front face 310 of printed circuit board 305 such that cover 330 and frame 335 of sealing configuration 320 may expand or contract relatively independently from other components of image sensor package 300, as explained in further detail below with reference to FIG. 9.

In a traditional image sensor package 300, wire bonds (not shown in FIG. 6) may electrically connect image sensor 505 to electronic components placed on front face 310 of printed circuit board 305 in corresponding portions of mating pad area 610. However, when various components of image sensor package 300 experiences thermal expansion during operation, the location of electronic components on corresponding portions of mating pad area 610 may move accordingly, thus causing wire bonds to no longer connect appropriate portions of image sensor 505 to correctly correlating electronic components on portions of mating pad areas 610. This creates issues of signal mismatch and signal shortages in image sensor package 300. Furthermore, placing electronic components on front face 310 of printed circuit board 305 in mating pad area 610 creates a higher risk of pad contamination. Therefore, embodiments of the present disclosure aim to resolve these issues by placing electronic components on back face 315 of printed circuit board 305, as explained in further detail below with reference to FIGS. 7 and 9.

Figure 7:
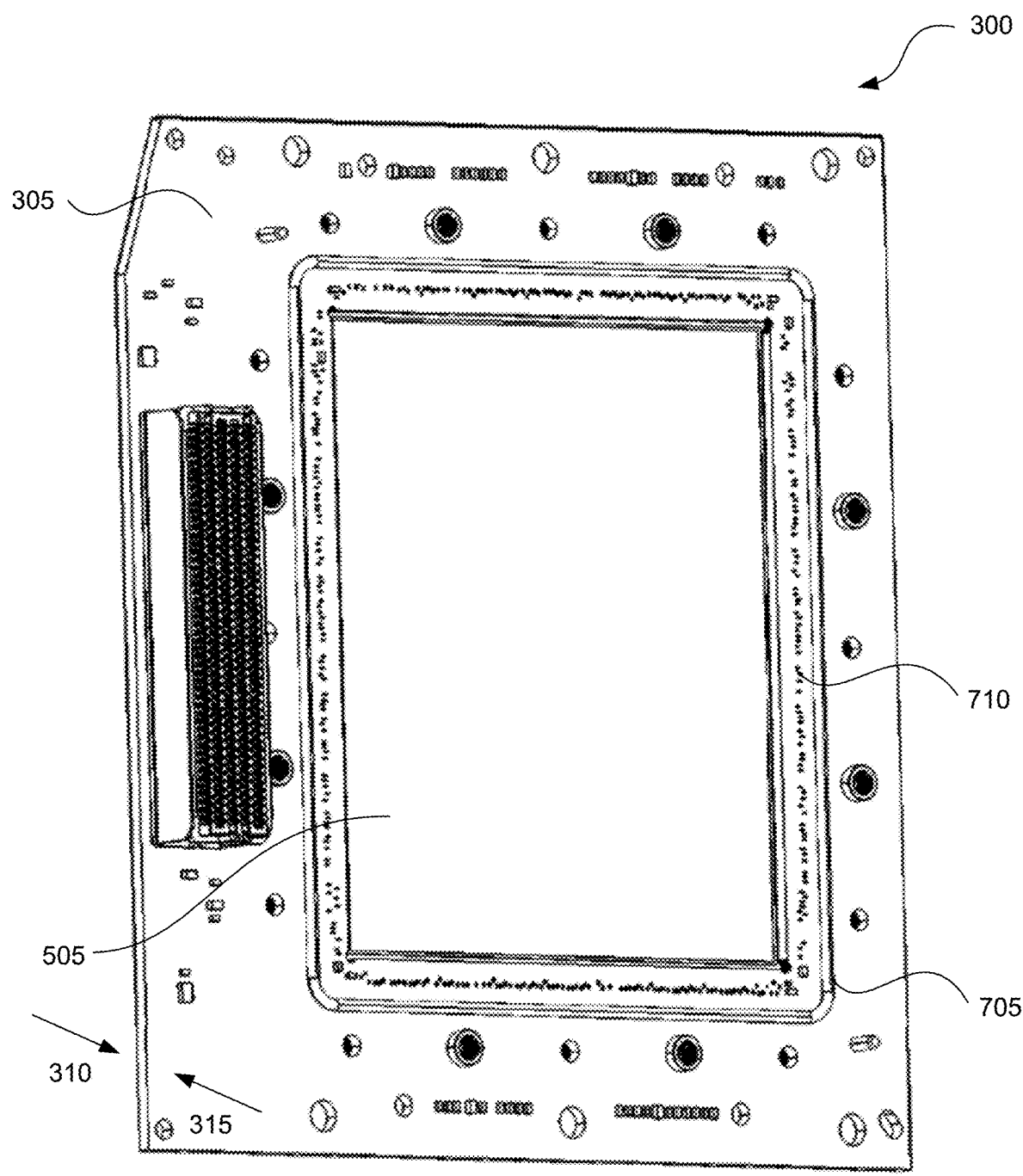
FIG. 7 illustrates a back perspective view of the image sensor package with a base removed, according to an exemplary embodiment of the present disclosure.

FIG. 7 illustrates a back perspective view of image sensor package 300 with base 405 removed, exposing image sensor 505, a second gasket 705 positioned beneath base 405, and electronic components 710 embedded on back face 315 of printed circuit board 305 between image sensor 505 and second gasket 705. It should be understood by those skilled in the art that additional layers of thermally conductive epoxy (not shown or enumerated in the embodiment of FIG. 7) may exist between image sensor 505 and base 405 to couple image sensor 505 to base 405, thus allowing base 405 to provide mechanical support for image sensor 505 and to couple image sensor 505 to printed circuit board 305. Since image sensor 505 may be very thin (e.g., under 1 mm thick) in some embodiments, base 405 is needed to provide a stable surface for image sensor 505. Furthermore, in some embodiments, base 405 may include layers of thermally conductive paste that serve as a thermal sink for image sensor 505. In order to accommodate for thermal expansion of base 405 and image sensor 505, base 405 may be made from a material with a substantially similar coefficient of thermal expansion as the material of image sensor 505. For example, in some embodiments, base 405 may be made from a ceramic while image sensor 505 may be made from silicon. Since ceramic and silicon may have substantially similar coefficients of thermal expansion, base 405 and image sensor 505 will expand and/or contract at substantially the same rate during operation of image sensor package 300, thus avoiding excessive compression or tensile stress of image sensor 505 during operation of image sensor package 300.

Second gasket 705 is configured to mechanically decouple base 405 and image sensor 505 from back face 315 of printed circuit board 305 such that base 405 and image sensor 505 may expand or contract relatively independently from other components of image sensor package 300, as explained in further detail below with reference to FIG. 9.

Figure 8:
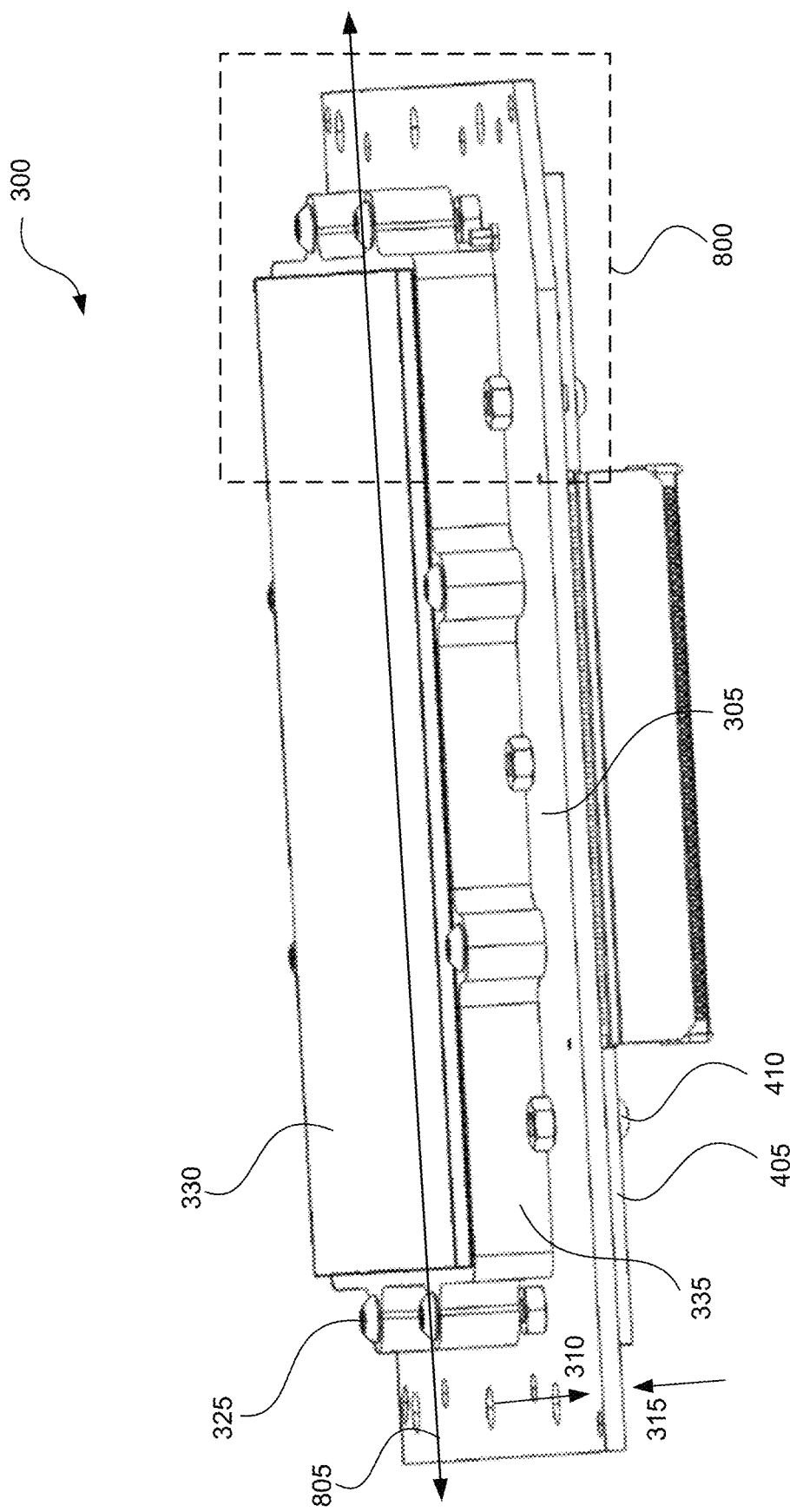
FIG. 8 illustrates a side perspective view of the image sensor package shown in FIG. 3, according to an exemplary embodiment of the present disclosure.

FIG. 8 illustrates a side perspective view of image sensor package 300, including printed circuit board 305, cover 330 and frame 335 coupled to front face 310 of printed circuit board 305, and base 405 coupled to back face 315 of printed circuit board 305, as previously explained with reference to FIGS. 3-7. FIG. 9 illustrates a cross-sectional view of image sensor package 300. Referring to FIG. 8, the cross-sectional view of FIG. 9 illustrates the cross-section of portion 800 of image sensor package 300 that is taken along reference line 805 across a longitudinal direction of image sensor package 300. Various components of image sensor package 300 will now be explained with reference to the exemplary embodiment illustrated in FIG. 9.

Figure 9:
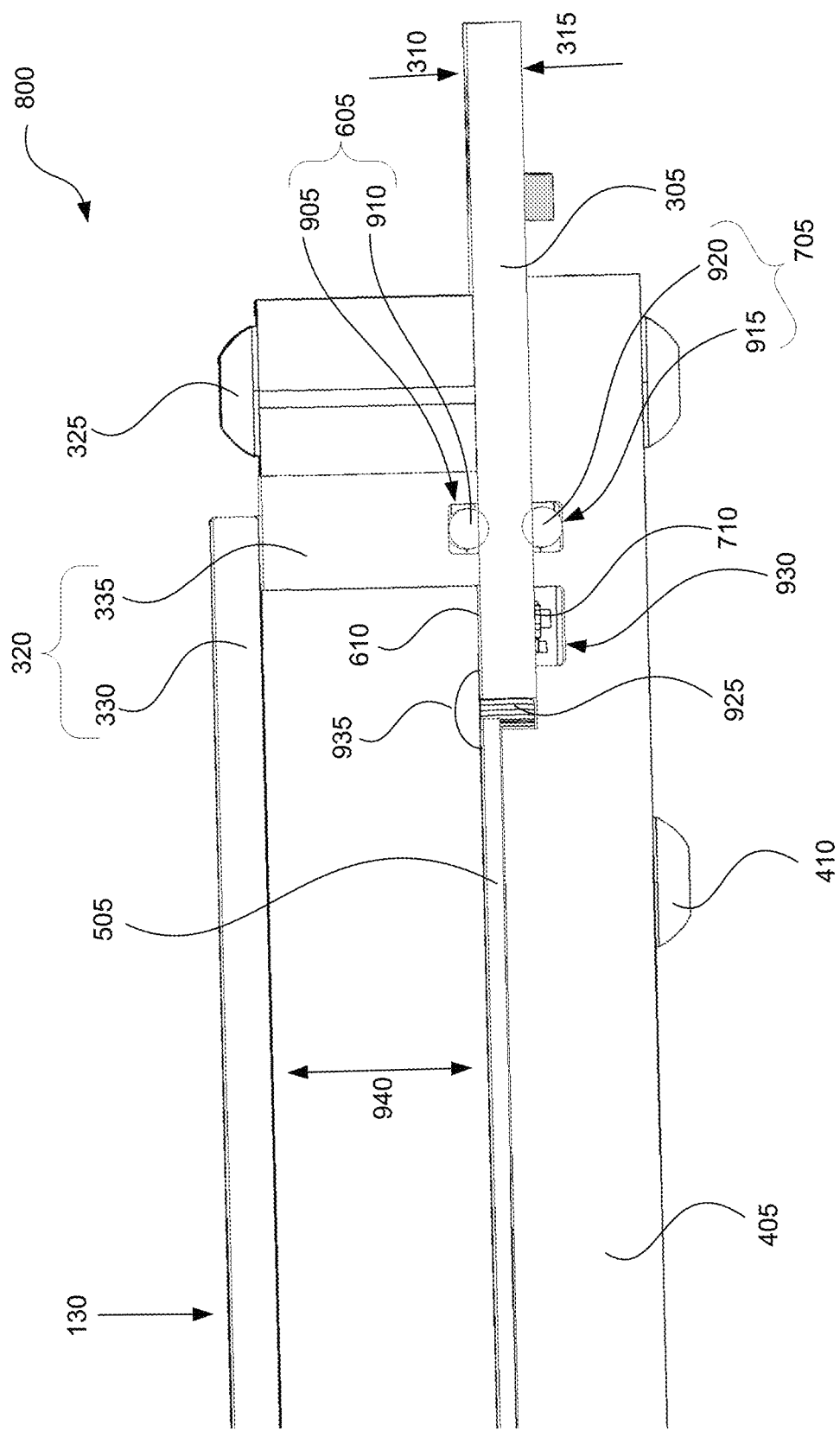
FIG. 9 illustrates a cross-sectional view taken along a longitudinal direction of the image sensor package, according to an exemplary embodiment of the present disclosure.

Referring to FIG. 9, image sensor package 300 includes printed circuit board 305 with front face 310 and back face 315. Sealing configuration 320 including cover 330 and frame 335 may be mechanically decoupled from front face 310 of printed circuit board via first gasket 605 (also see FIG. 6). Specifically, as shown in the embodiment of FIG. 9, first gasket 605 includes a first grove 905 positioned in frame 335 and a first ball-bearing 910 positioned in first grove 905. First ball-bearing 910 abuts front face 310 of printed circuit board 305 and allows sealing configuration 320 to be movable while abutting front face 310 of printed circuit board 305 when at least one of cover 330 and/or frame 335 of sealing configuration 320 experiences thermal expansion/contraction during operation of image sensor package 300. It should be understood by those skilled in the art that sealing configuration 320 may slide in any direction across front face 310 of printed circuit board 305 depending on how cover 330 and/or frame 335 experiences thermal expansion. This mechanical decoupling of sealing configuration 320 from front face 310 of printed circuit board 305 prevents excessive cracking of cover 330 and/or frame 335 during operation of image sensor package 300, thereby ensuring that sealing configuration 320 provides a hermetic seal to protect image sensor 505 from outside pollutants.

In some embodiments, base 405 may be coupled to image sensor 505 via a thermally conducting epoxy. Similar to the explanation above regarding first gasket 605, base 405 and image sensor 505 may be mechanically decoupled from back face 315 of printed circuit board via second gasket 705 (also see FIG. 7). Specifically, as shown in the embodiment of FIG. 9, second gasket 705 includes a second grove 915 positioned in base 405 and a second ball-bearing 920 positioned in second grove 915. Second ball-bearing 920 abuts back face 315 of printed circuit board 305 and allows base 405 and image sensor 505 to be movable while abutting back face 315 of printed circuit board 305 when at least one of base 405 and/or image sensor 505 experiences thermal expansion/contraction during operation of image sensor package 300. It should be understood by those skilled in the art that base 405 coupled to image sensor 505 may slide in any direction across back face 315 of printed circuit board 305 depending on how base 405 and/or image sensor 505 experiences thermal expansion. Furthermore, a gap 925 exists between the perimeter of image sensor 505 and the surrounding printed circuit board 305. Gap 925 is configured to provide a buffering space for image sensor 505 to expand during thermal expansion without stressing the integrity of the surrounding printed circuit board 305 or electronic components 710 embedded on printed circuit board 305. The mechanical decoupling of base 405 and image sensor 505 from back face 315 of printed circuit board 305 combined with gap 925 between image sensor 505 and the surrounding printed circuit board 305 help prevent excessive cracking of image sensor 505 during operation of image sensor package 300. This is especially necessary in large format camera systems 100 including larger components that are more heavily affected by thermal expansion during operation.

As explained above, to avoid traditional issues of pad contamination and signal mismatch/shortage caused by inaccurate wire bonding of image sensor 505 to corresponding electronic components 710 after experiencing thermal expansion, the embodiment of FIG. 9 places electronic components 710 on back face 315 of printed circuit board 305. As shown in the embodiment of FIG. 9, base 405 may further include a channel 930 surrounding the perimeter of image sensor 505. Channel 930 abuts back face 315 of printed circuit board 305 and aligns with mating pad area 610 on front face 310 of printed circuit board 305 (also see FIG. 6). A number of electronic components 710 necessary for the operation of printed circuit board 305 may be embedded on back face 315 of printed circuit board 305 and positioned within channel 930 of base 405. Image sensor 505 may be electrically connected to mating pad area 610 on front face 310 of printed circuit board 305 via a number of wire bonds 935. In some embodiments, electronic components 710 may be electrically connected to corresponding portions of mating pad area 610 through printed circuit board 305. This allows electronic components 710 to be electrically connected to appropriate portions of image sensor 505 through mating pad area 610 without requiring image sensor 505 to form direct wire bonds 935 with correlating electronic components 710.

The embodiment illustrated in FIG. 9 reduces the distance between electronic components 710 and wire bonds 935, thereby reducing power loss, increasing signal transmission speed, and preserving signal integrity. Furthermore, embedding electronic components 710 on back face 315 of printed circuit board 305 allows mating pad area 610 on front face 310 of printed circuit board 305 to be component-free, thereby minimizing the risk of pad contamination. Embedding electronic components 710 on back face 315 of printed circuit board 305 also allows printed circuit board 305 to be fully manufactured before any wire bonding of image sensor 505, thereby streamlining the manufacturing process to save time and money.

It should be understood by those skilled in the art that electronic components 710 may be various electronic components (e.g., capacitors) required for operations of image sensor 505 in different embodiments of the present disclosure. It should further be understood by those skilled in the art that the number of electronic components 710 and wire bonds 935 included in image sensor package 300 may vary in different embodiments of the present disclosure and not exhaustively described herein.

Still referring to FIG. 9, in some embodiments, cover 330 of sealing configuration 320 may be placed a predetermined distance 940 away from image sensor 505. Predetermined distance 940 may be calculatedly determined such that image sensor 505 may capture optimal resolution images from incoming light 130. For example, in embodiments where cover 330 is made of glass, imperfections such as air bubbles in the glass of cover 330 may reflect and/or refract incoming light 130, resulting in black spot projections on image sensor 500 that detrimentally affects the resolution of captured images. To avoid imperfections that project black spots on image sensor 505, the glass of cover 330 must be of high quality, which is much more expensive to manufacture, especially for large image sensors 505 in large format camera systems 100. As an alternative, the glass of cover 330 may be placed at predetermined distance 940 away from image sensor 505 such that imperfections in the glass creates blur spots rather than black spots in the captured image of image sensor 505. It should be understood by those skilled in the art that predetermined distance 940 may be any distance calculated for optimal image resolution in various embodiments of the present disclosure and not exhaustively detailed herein.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. An image sensor package, comprising:
   a printed circuit board having a first face and a second face;
   an image sensor electrically coupled to the printed circuit board via a plurality of wire bonds that electrically connect the image sensor to a plurality of mating pads positioned on the first face of the printed circuit board, the image sensor being surrounded by the printed circuit board in such a manner that the image sensor is separated from abutting the printed circuit board by a gap;
   a sealing configuration coupled to the first face of the printed circuit board via a first gasket, the sealing configuration having a cover attached to a frame that surrounds a perimeter of the image sensor, the first gasket enabling the sealing configuration to be movable while abutting the first face of the printed circuit board as the sealing configuration expands or contracts;
   a base coupled to the second face of the printed circuit board via a second gasket, the base coupling the image sensor to the printed circuit board, the second gasket enabling the base to be movable while abutting the second face of the printed circuit board as the base expands or contracts; and
   a plurality of electronic components embedded on the second face of the printed circuit board, the plurality of electronic components aligning with the plurality of mating pads on the first face of the printed circuit board.

2. The image sensor package of claim 1, wherein the gap between the image sensor and the printed circuit board is a predetermined distance.

3. The image sensor package of claim 1, wherein the first gasket comprises a first ball-bearing positioned within a first groove in the frame of the sealing configuration that allows the sealing configuration to be movable while abutting the first face of the printed circuit board.

4. The image sensor package of claim 3, wherein the second gasket comprises a second ball-bearing positioned within a second groove in the base that allows the base to be movable while abutting the second face of the printed circuit board.

5. The image sensor package of claim 1, wherein the base further comprises a channel surrounding the perimeter of the image sensor, and
   wherein the plurality of electronic components are positioned within the channel.

6. The image sensor package of claim 1, wherein the image sensor has a first coefficient of thermal expansion,
   wherein the base has a second coefficient of thermal expansion, and
   wherein the first coefficient of thermal expansion is substantially similar to the second coefficient of thermal expansion.

7. The image sensor package of claim 6, wherein the base comprises a ceramic base, and
   wherein the image sensor is attached to the ceramic base with a thermally conductive epoxy.

8. The image sensor package of claim 6, wherein the cover of the sealing configuration has a third coefficient of thermal expansion,
   wherein the frame of the sealing configuration has a fourth coefficient of thermal expansion, and
   wherein the third coefficient of thermal expansion is substantially similar to the fourth coefficient of thermal expansion.

9. The image sensor package of claim 8, wherein the cover comprises a glass cover, and
   wherein the frame comprises an alumina frame.

10. The image sensor package of claim 1, wherein the frame positions the cover a predetermined distance away from the image sensor.

11. The image sensor package of claim 1, wherein the plurality of electronic components comprises a plurality of capacitors.

12. The image sensor package of claim 1, further comprising at least one coupling mechanism coupling the frame to the first face of the printed circuit board.

13. The image sensor package of claim 12, wherein the at least one coupling mechanism comprises a screw.

14. The image sensor package of claim 1, wherein the plurality of mating pads on the first face of the printed circuit board are electrically coupled to the plurality of electronic components embedded on the second face of the printed circuit board.

15. The image sensor package of claim 1, wherein the plurality of mating pads on the first face of the printed circuit board surround the perimeter of the image sensor and are positioned between the frame and the image sensor.

16. An image sensor package, comprising:
   an image sensor;
   a printed circuit board surrounding the image sensor, the printed circuit board having a first face and a second face, the image sensor being surrounded by the printed circuit board in such a manner that the image sensor is separated from abutting the printed circuit board by a gap;

a sealing configuration surrounding a perimeter of the image sensor, the sealing configuration including a first gasket to couple the sealing configuration to the first face of the printed circuit board via, the first gasket surrounding the perimeter of the image sensor and enabling the sealing configuration to be movable while abutting the first face of the printed circuit board as the sealing configuration expands or contracts;

a base coupling the image sensor to the printed circuit board, the base including a second gasket to couple the base to the second face of the printed circuit board, the second gasket enabling the base to be movable while abutting the second face of the printed circuit board as the base expands or contracts; and a plurality of electronic components embedded in the printed circuit board, wherein the image sensor is electrically coupled to the surrounding printed circuit board via a plurality of wire bonds connecting to the first face of the printed circuit board, wherein the plurality of electronic components are embedded on the second face of the printed circuit board and aligned with the plurality of wire bonds on the first face of the printed circuit board, and wherein the plurality of wire bonds electrically connect the image sensor and the plurality of electronic components via the printed circuit board.

17. The image sensor package of claim 16, wherein the base and the image sensor have substantially similar coefficients of thermal expansion.

18. The image sensor package of claim 16, wherein the gap separating the image sensor and the printed circuit board is a predetermined distance.

19. An image sensor package, comprising:

an image sensor;

a printed circuit board surrounding the image sensor, the printed circuit board having a first face and a second face;

a sealing configuration coupled to the first face of the printed circuit board via a first gasket, the first gasket enabling the sealing configuration to be movable while abutting the first face of the printed circuit board as the sealing configuration expands or contracts; and a base coupling the image sensor to the printed circuit board, the base being coupled to the second face of the printed circuit board via a second gasket, the second gasket enabling the base to be movable while abutting the second face of the printed circuit board as the base expands or contracts.

20. The image sensor package of claim 19, wherein the first gasket comprises a first ball-bearing positioned within a first groove in the sealing configuration that allows the sealing configuration to be movable while abutting the first face of the printed circuit board, and wherein the second gasket comprises a second ball-bearing positioned within a second groove in the base that allows the base to be movable while abutting the second face of the printed circuit board.

* * * * *